United States Patent [19]
Schleeter

[11] 4,453,284
[45] Jun. 12, 1984

[54] CAR WASHING MACHINE

[76] Inventor: Robert H. Schleeter, 6358 Willow La., Minneapolis, Minn. 55430

[21] Appl. No.: 389,417

[22] Filed: Jun. 17, 1982

[51] Int. Cl.³ .............................................. B60S 3/04
[52] U.S. Cl. .................................. 15/97 B; 15/DIG. 2
[58] Field of Search ........... 15/DIG. 2, 53 A, 53 AB, 15/97 B

[56] References Cited

U.S. PATENT DOCUMENTS

| | | | |
|---|---|---|---|
| 3,517,405 | 6/1970 | Hanna et al. | 15/97 B |
| 3,774,259 | 11/1973 | Genaro | 15/97 B |
| 3,783,466 | 1/1974 | Bernardi | 15/53 A |
| 3,859,686 | 1/1975 | Breish | 15/97 B |
| 4,057,866 | 11/1977 | Belanger | 15/97 B |
| 4,104,756 | 8/1978 | Gasser et al. | 15/97 B |
| 4,305,174 | 12/1981 | Pyle et al. | 15/53 A |
| 4,369,541 | 1/1983 | Belanger et al. | 15/97 B |

Primary Examiner—Edward L. Roberts
Attorney, Agent, or Firm—Peterson, Palmatier, Sturm, Sjoquist & Baker, Ltd.

[57] ABSTRACT

A car washer for a stationary car, including a pair of tracks on the floor, between which the car remains, an upright arch frame to pass over the car and having wheels on the track; a plurality of scrubber curtains of cloth, felt-like material cut into strips and suspended from the frame to engage and scrub the automobile as the frame passes along the automobile, means oscillating the strips in side to side direction, spray nozzles directing cleaning solution onto the strips; the mobile frame moving along the car, first in one direction, then in the reverse direction; upright rotary scrubbers on arms which swing toward and away from the automobile body, the arms being mounted on the upright frame, the rotary scrubbers also being made of strips of cloth, felt-like material, nozzles directing cleaning solution onto such strips, the rotary scrubbers being reversible, and the control means for the rotary scrubbers requiring reversing of the rotary scrubbers when the mobile arch frame reverses its direction.

8 Claims, 9 Drawing Figures

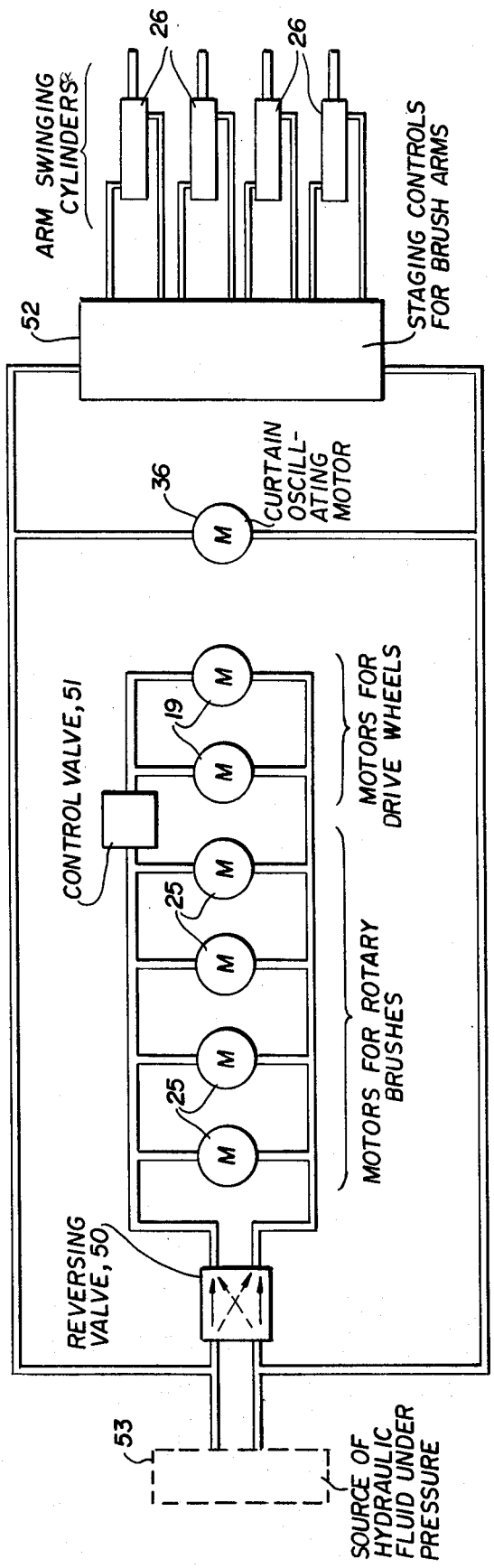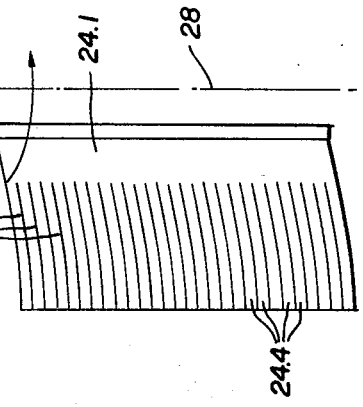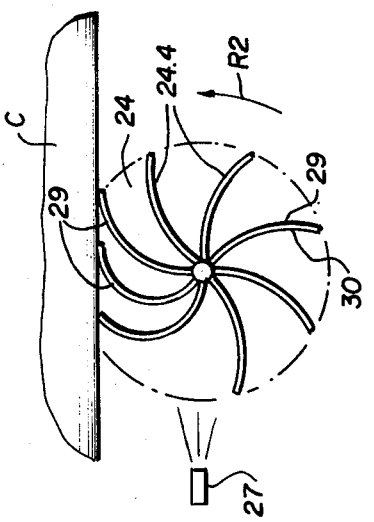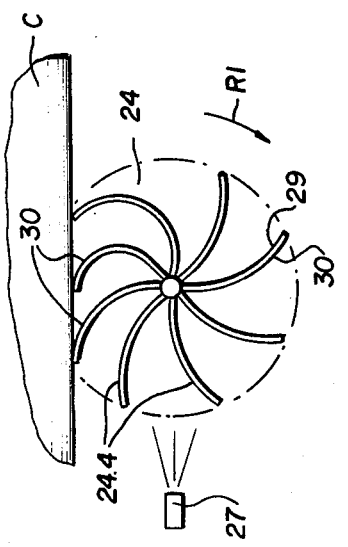

CAR WASHING MACHINE

This invention relates to a car washing machine of the general type, sometimes known as a roll over car wash wherein the automobile remains stationary and the washing equipment moves longitudinally along and over it.

BACKGROUND OF THE INVENTION

Automated equipment for washing automobiles has been made in two general types. Firstly, are the tunnel car washers, wherein the washing equipment is essentially stationary and the automobile is drawn through the equipment by a conveyor built into the floor. Such a tunnel car wash has numerous nozzles spraying water and cleaner onto the car passing through, side brushes for cleaning the sides of the automobile and wheels, top brushes or stripped curtains cleaning the hood and top of the automobile passing through, rinse water nozzles and air jets for drying the automobile.

The other type of car wash assumes that an automobile is driven into a certain location and then parked. The automatic washing equipment, sometimes known as a roll over car washer, then moves on tracks on the floor, and along and over the automobile. In the past, such equipment has used rotary side brushes for washing the sides of the car, and movable on long arms for traversing the ends of the automobile as well. Rotary brushes move over the hood, and top and trunk lid of the automobile, and move up and down as the car washer passes along the automobile. The top brush and the side brushes have been of plastic bristle type material, which scrub as they revolve against the surfaces of the automobile. Such plastic bristles are stiff, smooth surfaced strands with a length often in the range of 12 to 18 inches. These brushes are sufficiently stiff as to be self-supporting while protruding substantially radially from the mounting axle without significant flexing. These types of roll over car washers using plastic bristle brushes are rather hard on the finish or paint of the automobile body because of the stiffness of the bristles and also because often these car washers are used without any soap in the water, and this produces some scratching of the paint or surface finish. In addition, even though soap is used, the plastic bristles rapidly shed the liquid because the bristles whirl around at a high rate of speed and throw off any liquid that may temporarily be sprayed onto such bristles.

SUMMARY OF THE INVENTION

An object of the invention is to provide an improved car washing machine of the type which moves along and over an automobile which remains stationary so as to produce thorough cleaning of the automobile body while minimizing any likelihood of damage to the paint surface and other exterior features of the automobile body.

Another object of the invention is to provide an improved car wash machine which moves along and over a stationary automobile and which produces thorough, but gentle cleaning of all body surfaces and which produces washing of all of the nooks and corners of the exterior configurations of the automobile body as a result of approaching all of these locations from two different directions while minimizing any likelihood of damage to the surface or other exterior features of the body.

A feature of the present invention is a movable car washing machine which travels along a track on the floor, passing along and over a stationary automobile, and having a top scrubber including cloth, felt-like curtains in scrubbing strips suspended from a position over the top of the automobile and oscillated with a back and forth motion as the curtains are drawn over the parked automobile. The curtains are sprayed with water containing cleaning solution or detergent for loosening the contaminants or grime on the surfaces of the automobile body. The curtains and all of the strips thereof are hung so that the strips continuously face in the direction of movement of the car washer along the automobile. The curtains are oscillated so that as the lower ends of the curtain strips engage the top surfaces of the automobile body, they will oscillate to and fro, applying water with cleaning solution in it, and thereby producing a gentle scrubbing action.

The oscillating friction curtain strips will traverse the entire length of the automobile as the car washing machine moves entirely along the length of the automobile. Subsequently, the car washing machine reverses itself to commence a second phase in the car washing cycle, and the lower ends of the curtain strips approach the automobile body from a second direction. The strips, laden with cleaning solution, will reach into and oscillate on surfaces which the strips may not have had an opportunity to engage in the first pass of the car washing machine over the automobile. Also, in the second pass of the car washing machine over the automobile, it is the second surfaces of the scrubber strips which engage and oscillate along the automobile body. These surfaces of the curtain strips had not previously engaged the automobile body, but do so, on the return pass of the equipment, for the first time.

Similarly, those first surfaces of the scrubber strips which initially engaged and scrubbed the automobile body during the first pass of the washing machine over the car, do not engage the surface of the automobile in the second return pass of the washing machine, but remain essentially free of the automobile body surface. Accordingly, these first surfaces of the curtain strips are substantially non-functional during the return pass, and are simply rinsed by water being sprayed in the vicinity of the curtain strips so as to discharge all remaining grime and grit which may be contained thereon in preparation for use again during the next cleaning operation.

Simultaneously, with the top washing action of the top scrubber strips, the rotary side scrubbers of the machine move along the sides and across the ends of the automobile. These rotary side scrubbers, according to the present invention, are also made of cloth, felt-like fabric in narrow strips. These cloth side scrubbers also retain substantial amounts of water and cleaning solution and produce a gentle, but thorough scrubbing action along the side surfaces of the automobile body. Although these cloth side scrubbers retain substantial quantities of liquid, these side scrubbers revolve uniformly without producing any excessive bearing wear due to the additional weight. No unbalance in these rotary side brushes is experienced. While the first surfaces of the rotary scrubber strips are engaging and scrubbing the car body, the opposite surfaces of the strips are being rinsed, by sprayed cleaning solution, free of grit and grime.

When the washing machine reverses direction for its second pass along and over the car, the side scrubbers are reversed in their direction of rotation and therefore, these side brushes also approach adjacent areas of the body from a different direction, thereby producing a gentle, but thorough scrubbing of all variously shaped areas of the automobile body. The first surfaces of these rotary strips are now being rinsed, and the opposite surfaces of the strips are now doing the scrubbing.

One other feature of the present invention lies in the unique drive of the movable parts of the car washing machine, and especially the rotary side scrubbers. The car washing machine is driven by hydraulic motors, and the motors which drive the rotary side scrubbers produce a substantially high rotary speed without highly significant torque. The side scrubbers, although made of cloth felt-like fabric, will not get caught in appendages of the automobile body with the effect of tearing off such appendages or substantially damaging them, because the hydraulic motors are connected in parallel with each other in the hydraulic fluid supply ducts, and the side scrubbers, operating under relatively low torque, can be stopped easily in the event one of the scrubber strips of cloth felt-like fabric should become entangled in an appendage of the automobile body. This feature provides the advantage of making the present car washer safe with all types of automobiles, without fear of damaging either the finish of the automobile body paint, or any appendages which may protrude from the automobile body.

BRIEF DESCRIPTION OF DRAWINGS

FIG. 6 is a detail perspective view of one of the scrubbing elements in the rotary side scrubbers.

FIG. 7 is a top plan diagrammatic view of one of the rotary side scrubbers in the first mode of operation.

FIG. 8 is a top plan diagrammatic view of one of the side scrubbers in another mode of operation.

FIG. 9 is a hydraulic schematic diagram of the principle operating mechanisms of the machine.

DETAILED SPECIFICATION

Figure 1:
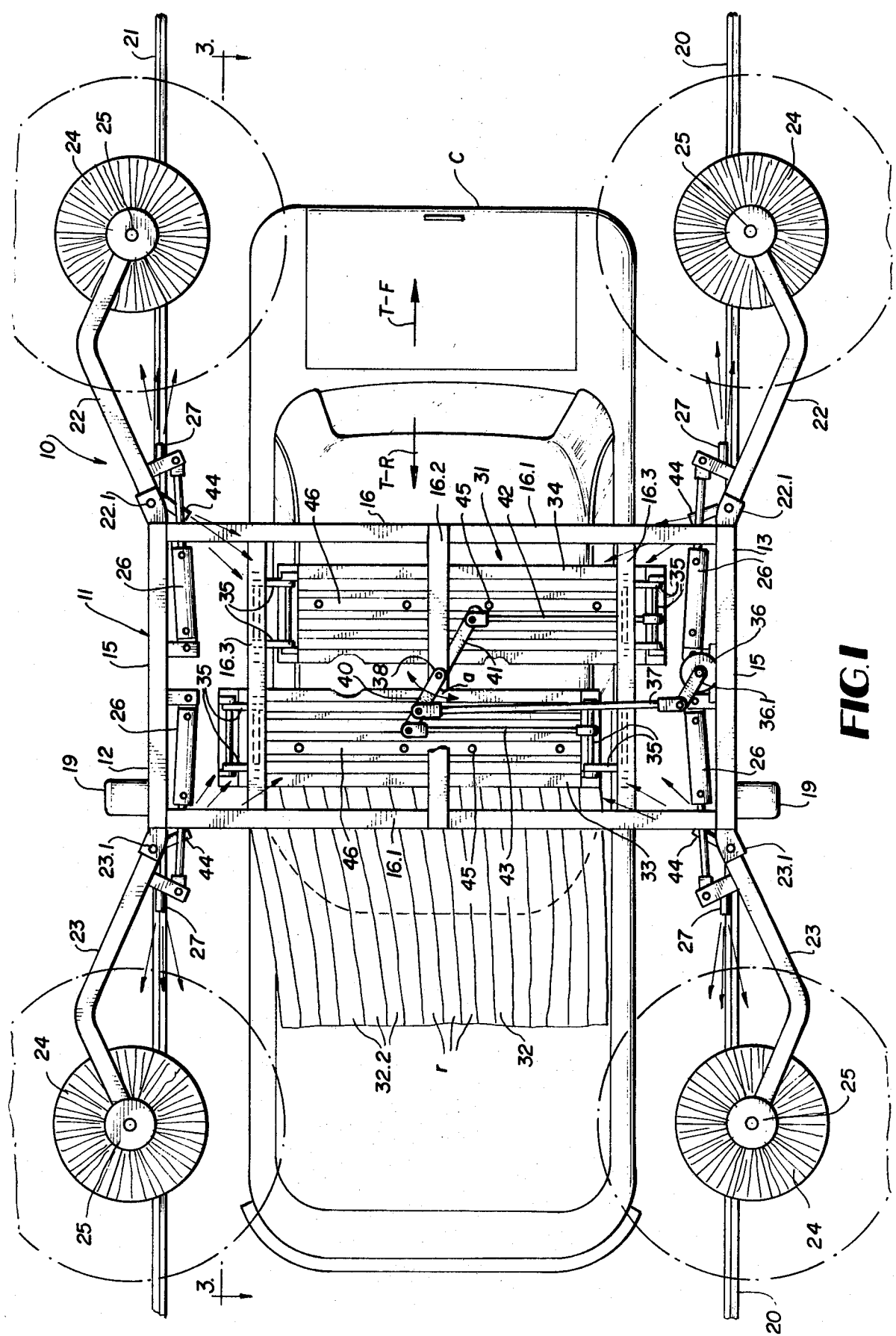
FIG. 1 is a top plan view of the apparatus, illustrated with a car in place for washing.

One form of the invention is illustrated in the drawings and is described herein. The car washing apparatus is indicated in general by numeral 10 and includes a mobile arch frame 11 constructed of rigid tubular steel. The mobile arch frame 11 has upright sides 12 and 13, each including a pair of spaced upright frame elements 14, and cross members 15, all welded together. The arch frame 11 also includes a spanning top 16 rigidly interconnecting the side frames 13 and welded thereto. The spanning top of the arch frame 11 includes longitudinal side frame elements 16.1, a center cross frame element 16.2, and end cross frame elements 16.3.

The side frames 13 have support and drive wheels 17 and 18 journaled thereon at the lower ends; and the drive wheels 18 are connected to the output shafts of hydraulic drive motors 19 affixed to the frame adjacent the wheels 18. Accordingly, the wheels 18 are rotatably powered so as to move the arch frame 11 forwardly and rearwardly across the floor F.

There are a pair of elongate rigid tracks 20 and 21 affixed on the floor, on which the wheels 17 and 18 are guided. The wheels 17 and 18 are suitably grooved to hold themselves on the tracks 20 and 21.

It will be recognized that the arch frame 11 is sufficiently wide to accommodate a car C beneath the spanning top and between the upright side frames 12 and 13.

The mobile arch frame 11 carries a pair of front swing arms 22 mounted at pivots 22.1 on the front end of the arch frame 11. There are also a pair of rear swing arms 23 at the rear end of the arch frame 11 and mounted on pivots 23.1 so as to swing transversely of the forward and rearward direction of travel of the arch frame as indicated by the arrows T-F and T-R. Each of the arms 22 and 23 carries a rotary scrubber 24 thereon on an upright axis. Each of the scrubbers 24 is driven by its own hydraulic motor 25.

Each of the arms 22 and 23 is also controlled by a double acting hydraulic cylinder 26, which effects the inward and outward swinging of the arm and the rotary scrubber mounted thereon. Each cylinder 26 is pivotably mounted on the adjacent side frame, and its piston rod is pivotably connected to a bracket welded to the swing arm.

Each of the arms 22 and 23 also mounts a spray nozzle 27 which directs a spray of cleaning solution at the rotary scrubber 24.

Each of the rotary scrubbers 25 includes a multiplicity of scrubber elements 24.1, one of which is illustrated in FIG. 6. The scrubber element is made from a sheet of cloth felt-like curtain material which is preferably formed of a synthetic material, such as polyester fibers, and has a thickness in the range of ⅛ to ¼ of an inch. The scrubbing element 24.1 extends the full length of the rotary scrubber 24 and is secured to the rotary shaft 24.2 thereof. Each of the multiplicity of scrubber elements 24.1 has a multiplicity of slits 24.3 defining a like number of elongate strips 24.4 which extend generally outwardly from the rotation axis 28 of the rotary scrubber 24. The strips 24.4 have a width, preferably in the range of ½ inch to ¾ of an inch, although the strips may, in some instances, be somewhat wider. The strips 24.4 are limp as to hang down when the rotary scrubber is stationary, but the strips will swing out almost normal to the rotation axis when the rotary scrubber is revolving.

The strips 24.4 have opposite faces 29 and 30 which will tend to lie substantially flat or flush against the body of the car C as the scrubber 24 moves along the side of the car. As will be more fully pointed out hereinafter, each of the rotary scrubbers 24 is reversible during the operational cycle of the car washing apparatus and first turns in one direction as indicated by arrow R1 in FIG. 7 during the first phase of the operational cycle, and then revolves in the opposite direction R2 in the second phase of the operational cycle. It will be clear in FIGS. 7 and 8 that as the rotary scrubber 24 revolves in one direction, as seen in FIG. 7, the surfaces 30 of the strips 24.4 are doing the scrubbing along the surface of the car C, and the cleaning solution being sprayed from nozzles 27 is providing the necessary cleaning material for assisting the scrubbing; and the cleaning solution from the nozzles 27 is also producing a rinsing action of the opposite face 29 of each of the strips 24.4.

Conversely, when the rotary scrubber 24 is revolved in the opposite direction as indicated by arrow R2 in FIG. 8, the faces 29 of the strips 24.4 are doing the scrubbing, and the cleaning solution from the nozzles 27 is providing the necessary cleaning liquid to assist in the scrubbing action. Simultaneously, the cleaning solution from the nozzle 27 is rinsing the opposite faces 30 of the strips 24.4 so as to remove any accumulated debris or grit therefrom.

Figure 2:
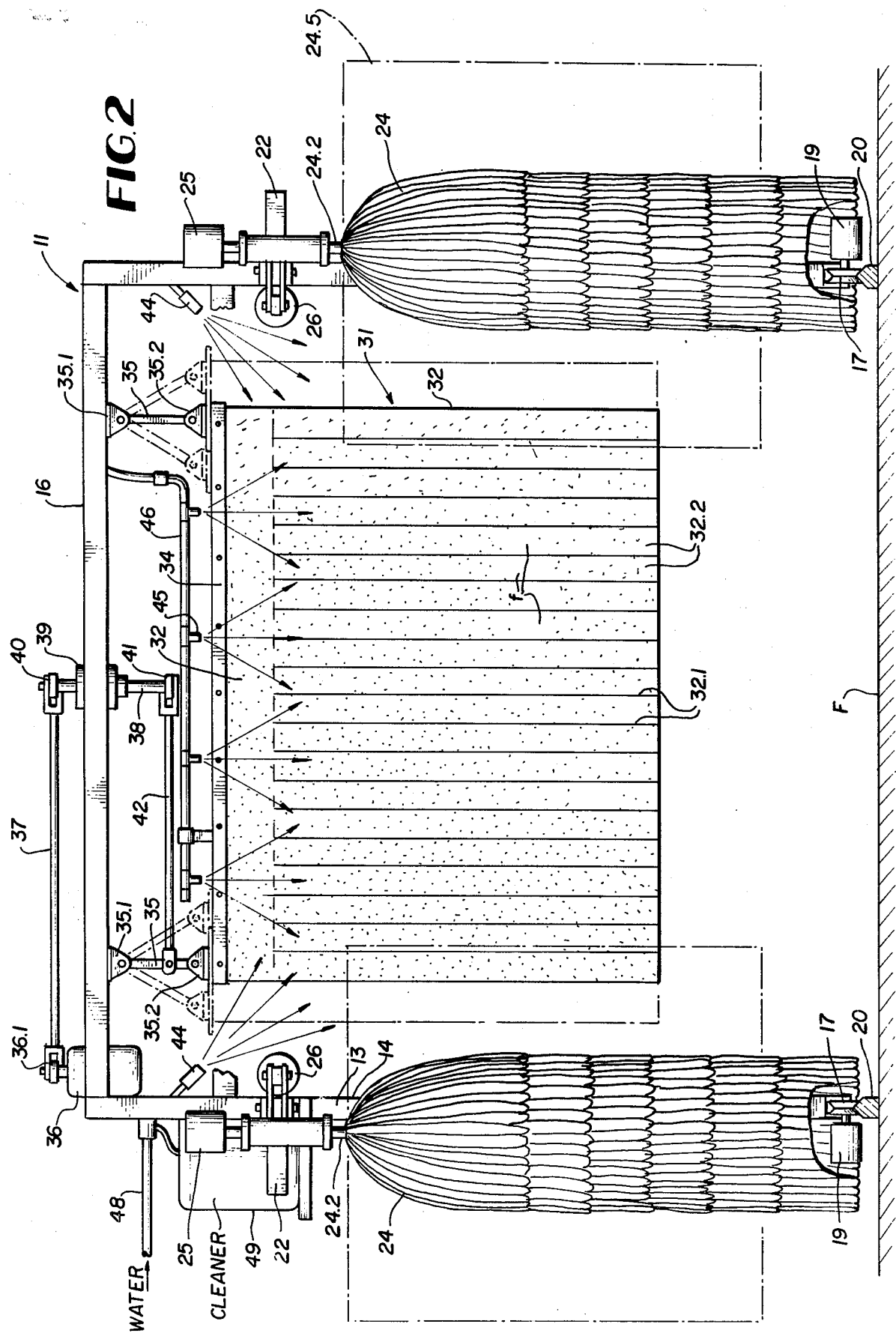
FIG. 2 is an end elevation view.
Figure 3:
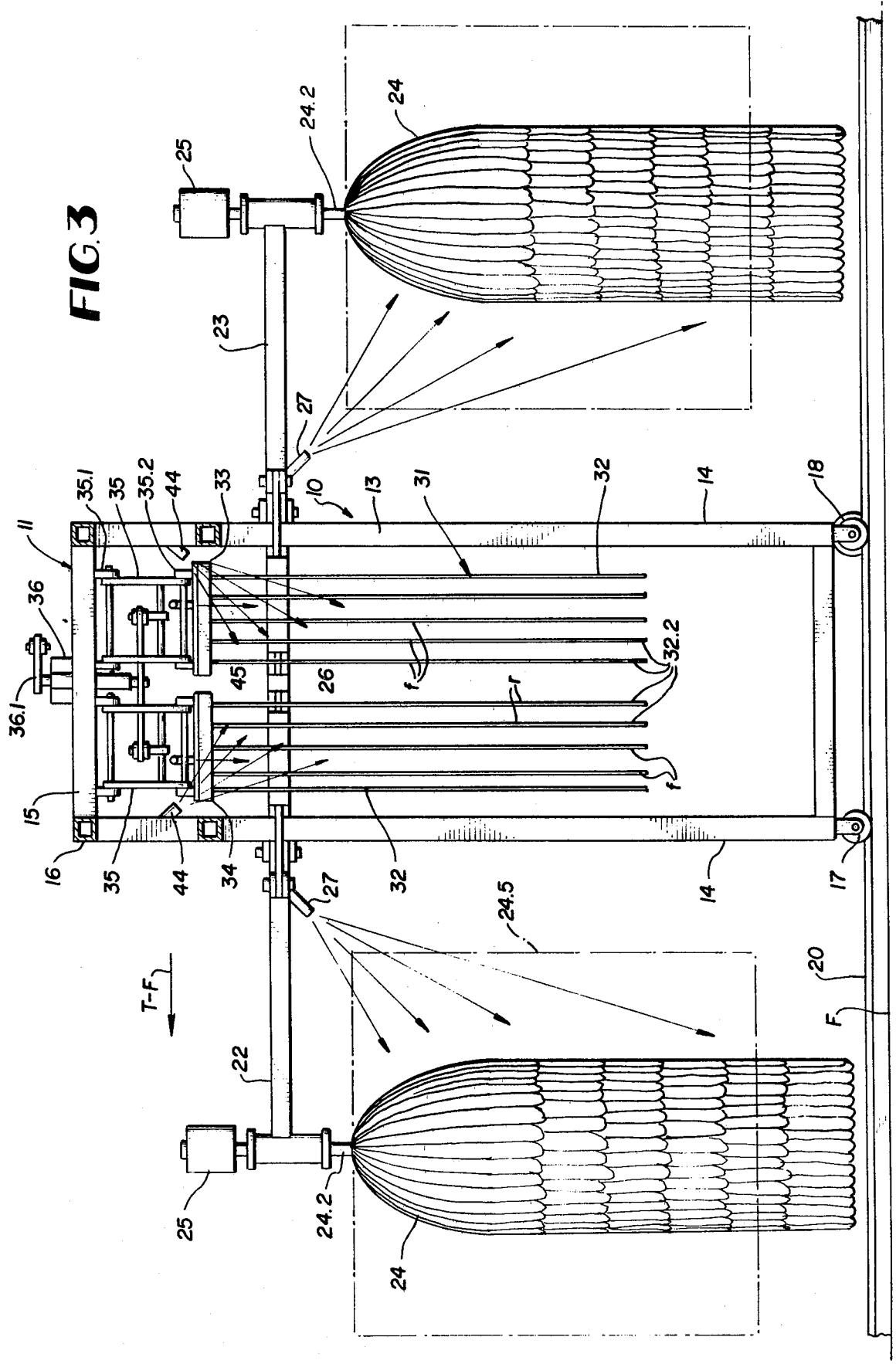
FIG. 3 is a detail section view taken approximately at 3.3 of FIG. 1.
Figure 4:
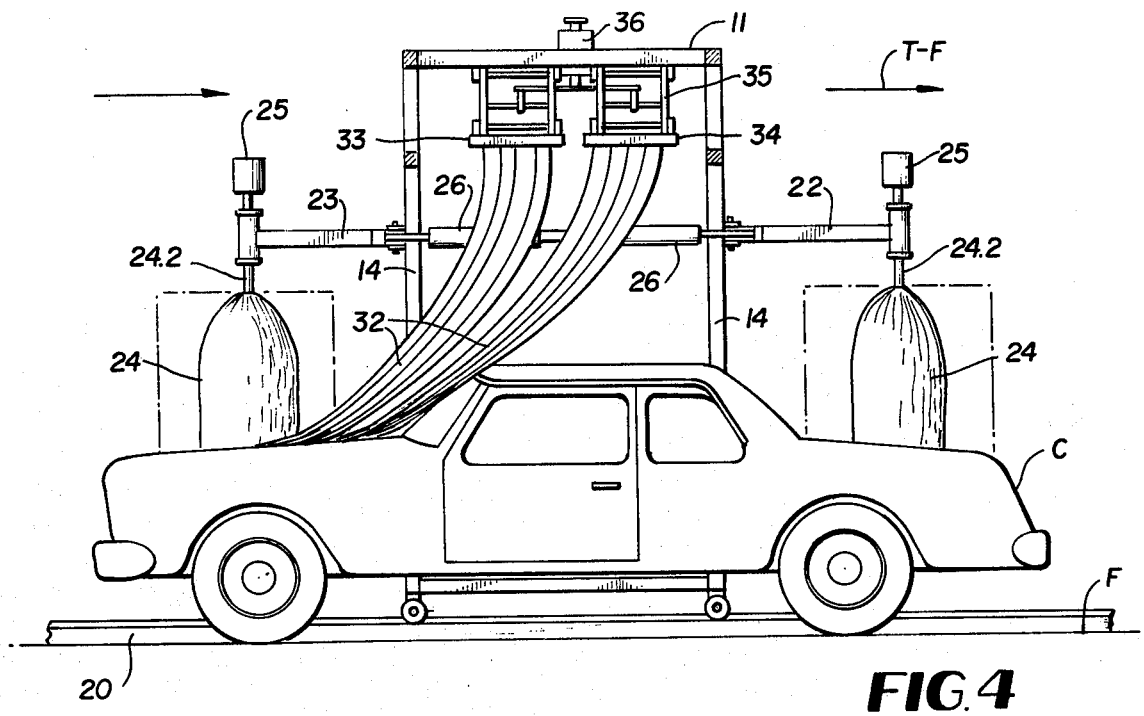
FIGS. 4 and 5 are diagrammatic sketches, substantially similar to FIG. 3 showing the mode of operation of the machine in different phases of operation.
Figure 5:
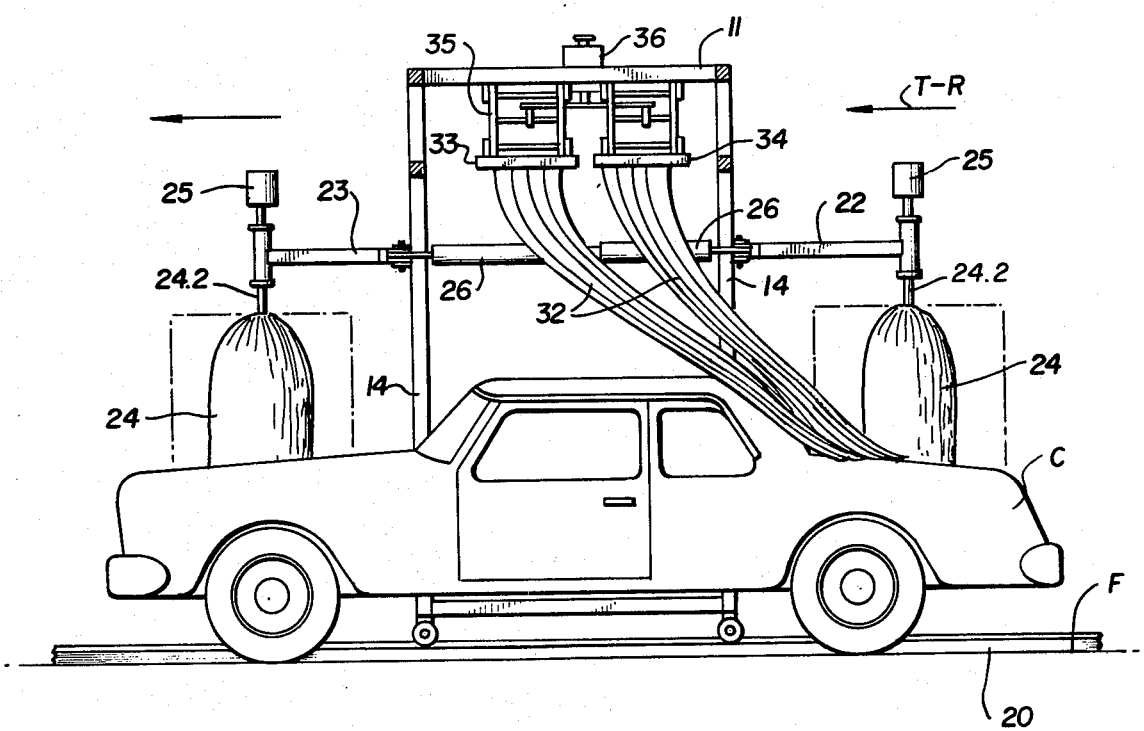

It will be seen in FIGS. 2 and 3, that when the rotary scrubbers 24 are stationary, as illustrated in full lines, the strips 24.4 hang down because they are quite limp; however, when the rotary scrubbers 24 are revolved at high speed, the cleaning elements 24.1 and the strips 24.4 stand out to the sides, as substantially as indicated by dotted lines 24.5, so that the strips will engage the surface of the car adjacent the mobile arch frame.

The cylinders 26 are operated automatically to stage the swinging of arms 22 and 23 so that as the mobile arch frame moves adjacent one end or the other of the car C, the rotary scrubbers will move across the ends of the car and the other set of rotary scrubbers will be moving along the sides of the car.

A top scrubber, indicated in general by numeral 31, is suspended from the spanning top 16 of the arch frame, as to clean and scrub the hood, top, and trunk lid of the car C. The top scrubber 31 comprises two sets of scrubbing curtains 32 suspended from a pair of oscillatable mounting racks 33 and 34. Each of the racks 33 and 34 suspends five identical scrubbing curtains 32 in closely spaced relation to each other. Each of the scrubber curtains 32 is made of a cloth felt-like material, substantially identical to the material in the rotary scrubbers 24. The curtains 32 have a thickness in the range of ⅛ to ¼ of an inch and are formed of a synthetic material, such as polyester.

Each of the curtains 32 has a multiplicity of elongate slits 32.1 therein so as to define a like number of elongate downwardly extending scrubber strips 32.2 which, as illustrated, are approximately 2 to 3 inches wide. The upper portions of the curtains 32 are not slit and are clamped to the racks 33 and 34. The racks 33 and 34 are at such a height as to be spaced well above the top of a car C, and the lower edge of the curtains 32 is spaced well off the floor, but sufficiently low as to hang down to the level of the hood and trunk lid of all of the modern cars which will be washed. The lower ends of all of the strips 32.2 may be at the same height above the floor; or if desired, the lower ends of the strips may vary somewhat, relative to each other, in their spacing from the floor.

Each of the racks 33 and 34 is swingably suspended by a rigid link 35 at each of its ends. The top ends of each of the links 35 is swingably mounted in a bearing 35.1 affixed on the end cross frame elements 16.3 of the spanning top 16. The lower end of each of the links 35 is swingably mounted in a pair of bearings 35.2 which are rigidly affixed on the racks 33 and 34 so that each of the racks may swing independently of the other rack in a side to side direction relative to the forward and rearward direction of travel of the arch frame 11 along the tracks 20 and 21. By reason of the links 35 and bearings 35.1, 35.2, the racks 33 and 34 and the scrubber curtains 32 suspended therefrom are free to be oscillated to provide the scrubbing strips 32.2 with a scrubbing action on the car as the arch frame moves along the car.

Oscillatory motion of the frames 33 and 34 is produced by a mechanical oscillator driven from a hydraulic motor 36 affixed to one end of the spanning top 16. The hydraulic motor 36 has a rotating crank arm 36.1 on its output shaft and the crank arm 36.1 is pivotably connected to one end of a reciprocating drive link 37 which extends along the spanning top 16. An upright oscillator shaft 38 is rotatably mounted in suitable bearings 39 on the center cross element 16.2 of the spanning top 16; and the upper end of the shaft 38 has a drive arm or rocker arm 40 affixed thereon. The other end of drive link 37 is connected to drive arm 40 with a pivot. Accordingly, as the motor 36 revolves, the link 37 reciprocates and rotatably oscillates the arm 40 as indicated by the arrow a in FIG. 1, and to similarly rotatably oscillate shaft 38.

The lower end of shaft 38 has a cross head 41 affixed thereon and extending outwardly in both directions from the shaft 38. Opposite ends of the cross head 41 are pivotally connected to drive links 42 and 43 which are pivotally connected to rigid links 35 which respectively suspend racks 34 and 33. Accordingly, as the shaft 38 is given a rocking motion, the drive links 42 and 43 drive the racks 34 and 33, respectively, in opposite directions and produce movement between the extreme dotted line positions illustrated in FIG. 2. Accordingly, as the scrubber strips 32.2 engage the surface of the car C, with a side to side motion produces a scrubbing action on the surface of the car. Of course, only one surface of each of the scrubbing strips 32.2 engages the car and produces the scrubbing action in any one phase of the operational cycle. For instance, as the arch frame is moving forwardly in the direction of arrow T-F in FIG. 1, one surface f of each of the strips 32.2 will be scrubbing the surface of the car C, while the other surface r of the same strip is being rinsed by cleaning solution sprayed from a nearby nozzle. Then when the arch frame 11 moves in the opposition direction T-R, the other opposite surface r of each of the strips 32.2 will produce the scrubbing action and the surface f of the strip which produced the scrubbing in the first phase of the operation is now being rinsed by the cleaning solution being sprayed from nearby nozzles.

The direction of oscillation of the curtains in relation to the orientation is significant to the invention. The curtains 32, when hanging free, lie in vertical planes parallel to their direction of oscillation. As the curtains 32 engage the body of the car C, the scrubber strips swing out of those planes, and lie generally horizontally on the hood, trunk lid, or body top.

In this generally horizontal position, the lower portion of each strip, laden with cleaning solution, may no longer precisely follow the oscillatory movement of the top portion of the curtain 32 which suspends the strip. Instead, the oscillation effectively establishes a generally upright axis between and about which the distal and proximal portions of the scrubber strip oscillate in opposite directions as to twice scrub each area of the car body as the strip is pulled over the car body. Such upright axis is not stationary in relation to the strip, but moves almost randomly as various contours of the car body are encountered by the adjacent oscillating distal and proximal scrubbing portions of the strip.

The thorough rinsing of each face after alternate use of both faces of each strip during each cycle of the washing machine 10 is significant because grit and debris loosened and collected by the scrubbing action is disposed of. Each area of the car body is scrubbed by a first face of a strip, and then a freshly rinsed second face of the strip scrubs the area again, while the first face is being rinsed.

Additional cleaning solution nozzles 44 on each of the corners of the mobile arch frame are directed toward the scrubber curtains 32 to provide substantial quantities of cleaning solution for producing both scrubbing action and rinsing of the strips. Additionally, nozzles 45 are directed downwardly from manifold pipes 46 which are rigid with the racks 33 and 34. A hose connects each of the rigid manifolds on each rack to the source of cleaning solution. Preferably, the cleaning solution comprises ample proportions of water supplied through pipe 48, and a container 49 of detergent or similar cleaning liquid supplies detergent is metered into the flowing water for producing the cleaning solution sprayed from all of the nozzles.

Attention is invited to FIG. 9 which shows the general controls of the system and particularly the hydraulic controls for the several motors. The rotary scrubber motors 25 are all connected in parallel with each other and hydraulic fluid is supplied through a reversing valve 50 so that the hydraulic fluid pressure may be reversed, thus reversing the direction of rotation of motors 25. Similar reversing of the motors 19 for driving the wheels 18 is accomplished by the reversing valve 50. A separate control valve 51 may be supplied in series with the wheel motors 19 so that the travel of the arch frame may be separately controlled. The rotary scrubber arm operating cylinders 26 are controlled by a staging control 52 so as to cause inward swinging of the several arms 22, and 23, and their respective rotary scrubbers 24 in the proper sequence, so as to thoroughly clean across the ends of the car and to thoroughly clean the sides of the car as well. Of course, the hydraulic fluid is supplied from a suitable source 53, which may be a pump, reservoir, and pressure tank.

It will be seen that gentle washing of the car body is accomplished by the scrubbers 24 and 31 as the arch frame travels first forwardly in a first pass over the car, and then travels rearwardly in a second pass over the car. The oscillating scrubber strips 32.2, in the first pass, approach the body surfaces of the car from one direction; and during the return or second pass of the washer, the scrubber strips 32.2 approach the body surfaces from the opposite direction so as to get into the various corners and nooks that may possibly have been missed in the first pass.

In addition, the reversing of the rotary side scrubbers in the two forward and reverse passes along the car cause the scrubber strips 24.4 to approach the car surfaces in opposite directions, thereby getting into and scrubbing the car body in all of its nooks and corners and around appendages.

During the forward and reverse passes of the washer along the car, the opposite faces, or the obverse and reverse faces of the scrubber strips 32.2 and 24.4 alternately scrub the adjacent car body and undergo a rinsing to remove grit and grime to be prepared for scrubbing again on the next pass of the washer along the car.

Use and rinsing of both the obverse and reverse faces of the scrubber strips 32.2 is obtained by the forward and reverse travel of the washer along and over the car.

Use and rinsing of both the obverse and reverse faces of the rotary scrubber strips 24.4 is obtained by reversing the direction of rotation of the rotary scrubbers 24 in the two passes of the washer along the car.

It is important to note that the unslit top portions of the scrubber curtains 32 are in a transverse plane which lies transverse to the forward and rearward travel of the washer along the floor. The oscillation of the racks and curtains is in a direction parallel to said transverse plane. The resulting oscillation and the manner of movement of the lower ends of the scrubber strips 32.2 will vary with the direction and degree to which such lower ends are swung out of such transverse plane. Accordingly, the oscillating lower ends of the strips 32.2 will not only approach the body surfaces from different directions during the forward and reverse passes along the car, but the varying oscillatory movement of these lower ends contributes materially to scrubbing and cleaning the body in all of the nooks and corners not otherwise reached.

What is claimed is:

1. A car washing apparatus movable along the floor and over a stationary car, comprising
   a mobile arch frame having upright sides spaced from each other and supported from the floor for travel along the stationary car, the arch frame having a car spanning top connecting the upright sides together and passing over the top of the car during such travel, and the frame having reversible means producing travel of the frame over the car first in one direction and then in the opposition direction,
   car scrubbing means on the frame and including a top scrubber beneath said spanning top for scrubbing the hood and top of the car, the top scrubber having an oscillating rack on the arch frame and a multiplicity of cloth felt-like scrubbing strips hanging downwardly from the oscillating rack to engage and scrub the car, the scrubbing means also including spray nozzles directing cleaning solution at the scrubbing strips and the adjacent car, the scrubbing strips having obverse and reverse faces facing generally forwardly and rearwardly relative to the travel of the mobile arch frame, the obverse faces engaging and scrubbing the car during travel of the frame in said one direction and the reverse faces engaging and scrubbing the car during travel of the frame in said opposite direction whereby the obverse and reverse faces of the oscillating strips are alternately rinsed to be cleaned and used for scrubbing the surfaces of the car as the mobile frame is first moved in said one direction and then reversed and moved in said opposite direction.

2. A car washing apparatus according to claim 1 and mounting means for the oscillating rack and limiting oscillation thereof in a side to side direction transversely of the travel of the mobile arch frame.

3. A car washing apparatus according to claim 2 wherein said scrubbing strips are arranged in a plurality of rows spaced from each other in the direction of travel of the arch frame, the scrubbing strips have lower end portions to lie upon and cover a significant area of the hood and top of the car and to oscillate in a scrubbing action on the car, the nozzles directing spray to rinse the faces of the scrubbing strips and to supply cleaning solution for cleaning the car.

4. A car washing apparatus according to claim 3 wherein the top scrubber has a pair of oscillating racks suspending said cloth felt-like scrubbing strips, the top scrubber also including mounting linkage requiring said oscillating racks to move in opposite directions relative to each other to produce simultaneous scrubbing of the car surfaces in opposite directions as the arch frame and scrubbing strips are moved along the car.

5. A car washing apparatus according to claim 1 and said car scrubbing means including rotary side scrubber adjacent opposite sides of the arch frame for scrubbing the opposite sides of the car, the rotary side scrubbers including cloth felt-like scrubbing strips oriented to lie substantially parallel to the rotation axis when extended outwardly from the rotation axis during rotation, said reversible means also producing rotation of the side scrubbers and reversing the rotation thereof as the arch frame is reversed in its direction of travel, whereby the opposite faces of the scrubbing strips of the rotary side scrubbers alternately produce a scrubbing function and alternately are rinsed by the spray from the nozzles.

6. A car washing apparatus movable along the floor and over a stationary car, comprising a mobile arch frame having upright sides spaced from each other and supported from the floor for travel in forward and rearward directions longitudinally along the sides of the stationary car, the frame having a car spanning top connecting the upright sides together and passing over the top of the car during such forward and rearward travel, upright side scrubbers on the arch frame and adjacent said upright sides for moving along and scrubbing the sides of the car, a plurality of upright cloth felt-like curtains suspended beneath the spanning top of the arch frame and extending between the upright sides thereof and transversely of said forward and rearward direction of travel, the cloth curtains having a multiplicity of upright slits defining numerous depending scrubbing strips to engage the car body, a multiplicity of spraying nozzles directing liquid cleaning solution onto the cloth curtains and side scrubbers and the car, a rack supporting and suspending the cloth curtains, yieldable means mounting the rack on the arch frame and accommodating oscillatory movement of the rack to oscillate the curtain strips as the arch frame and cloth curtains pass over the car, and oscillatory drive means connected with said rack and producing oscillatory movement of the curtain strips as the arch frame, side scrubbers and cloth curtain first pass along and over the car in the forward direction and then in the rearward direction, whereby opposite faces of the cloth strips are alternately rinsed and engaged with the car body, respectively, during forward and rearward movement of the curtain over the car body, which is also being gently scrubbed by such oscillating strips moving over various car body surfaces in several directions.

7. A car washing apparatus according to claim 6 wherein the side scrubbing means has rotors on upright axes and mounted on swinging arms, the rotors having cloth felt-like strips extending from the rotation axis and having the flat surfaces oriented parallel to the rotation axis and facing transversely of the rotation axes to lie flat against the upright sides of the car body.

8. A car washing apparatus according to claim 6 and the drive means oscillating the rack in side to side direction relative to the forward and rearward travel of the mobile arch frame, and the curtains and scrubbing strips facing forwardly and rearwardly relative to such travel.

* * * * *